(12) United States Patent  
Moler et al.

(10) Patent No.: US 7,021,191 B2  
(45) Date of Patent: Apr. 4, 2006

(54) ACCURATE FLUID OPERATED CYLINDER POSITIONING SYSTEM

(75) Inventors: Jeff Moler, Sarasota, FL (US); Mike Alexy, Sarasota, FL (US); Mark Oudshoorn, Parrish, FL (US)

(73) Assignee: Viking Technologies, L.C., Sarasota, FL (US)

( * ) Notice: Subject to any disclaimer, the term of this patent is extended or adjusted under 35 U.S.C. 154(b) by 0 days.

(21) Appl. No.: 10/763,500

(22) Filed: Jan. 23, 2004

(65) Prior Publication Data

US 2004/0200349 A1 Oct. 14, 2004

Related U.S. Application Data

(60) Provisional application No. 60/442,191, filed on Jan. 23, 2003, provisional application No. 60/471,031, filed on May 16, 2003, provisional application No. 60/460,549, filed on Apr. 4, 2003.

(51) Int. Cl.  
*F15B 11/10* (2006.01)

(52) U.S. Cl. .............................. 91/393; 91/397; 91/433

(58) Field of Classification Search .................. 91/392, 91/393, 397, 403, 433; 92/131  
See application file for complete search history.

(56) References Cited

U.S. PATENT DOCUMENTS

| 3,099,289 | A | * | 7/1963 | Neilson et al. ................ 92/131 |
|---|---|---|---|---|
| 4,080,873 | A | | 3/1978 | Bauer et al. |
| 4,106,390 | A | | 8/1978 | Kodaira et al. |
| 4,121,504 | A | | 10/1978 | Nowak |
| 4,379,335 | A | | 4/1983 | Kirsch et al. |
| 4,431,873 | A | | 2/1984 | Dunn et al. |
| 4,450,753 | A | | 5/1984 | Basrai et al. |
| 4,481,451 | A | | 11/1984 | Kautz et al. |
| 4,481,768 | A | | 11/1984 | Goshorn et al. |
| 4,628,499 | A | | 12/1986 | Hammett |
| 4,686,338 | A | | 8/1987 | Kashiwagi et al. |
| 4,736,131 | A | | 4/1988 | Fujimoto |
| 4,741,247 | A | | 5/1988 | Glomeau et al. |

(Continued)

FOREIGN PATENT DOCUMENTS

DE  199 12 334 A1  9/2000

(Continued)

OTHER PUBLICATIONS

Karim Khayati, Pascal Bigras and Louis-A. Dessaint; Non-linear Control of Pneumatic Systems; Ecole de Technologie Superieure; 1100, rue Notre-Dame Quest, Montreal (Quebec) H3C 1K3.

(Continued)

*Primary Examiner*—F. Daniel Lopez  
(74) *Attorney, Agent, or Firm*—Young & Basile, P.C.

(57) ABSTRACT

A position control system is used for controlling a fluid operated cylinder having at least one fluid chamber defined by a piston located within a housing for movement between first and second end limits of travel. The system includes at least two electrically actuated proportional flow control valves connected to each port of the cylinder for selectively and proportionally controlling fluid flow into and out of the at least one chamber. At least one pressure sensor is provided for measuring fluid pressure with respect to each chamber. At least one discrete position sensor is located adjacent a midpoint of the cylinder for sensing a discrete centered position of the piston. A controller includes a program and is operably connected for controlling actuation of the at least two valves in response to pressure measured by the at least one pressure sensor and location measured by the at least one position sensor.

30 Claims, 2 Drawing Sheets

U.S. PATENT DOCUMENTS

| | | | |
|---|---|---|---|
| 4,808,874 | A | 2/1989 | Stahlhuth |
| 5,211,196 | A | 5/1993 | Schweim |
| 5,271,226 | A | 12/1993 | Stone |
| 5,333,455 | A | 8/1994 | Yoshioka |
| 5,388,751 | A | 2/1995 | Harada et al. |
| 5,425,941 | A | 6/1995 | Wilson et al. |
| 5,431,086 | A | 7/1995 | Morita et al. ........... 91/361 |
| 5,465,021 | A | 11/1995 | Visscher et al. |
| 5,546,847 | A * | 8/1996 | Rector et al. ........... 91/403 |
| 5,587,536 | A | 12/1996 | Rasmussen |
| 5,881,767 | A | 3/1999 | Loser |
| 6,230,606 | B1 | 5/2001 | Sato |
| 6,234,060 | B1 | 5/2001 | Jolly |
| 6,291,928 | B1 | 9/2001 | Lazarus et al. |
| 6,305,264 | B1 | 10/2001 | Yang et al. |
| 6,431,340 | B1 | 8/2002 | Ineson et al. |
| 6,453,261 | B1 | 9/2002 | Boger et al. |
| 6,467,264 | B1 * | 10/2002 | Stephenson et al. ........ 91/454 |
| 6,523,451 | B1 | 2/2003 | Liao et al. |
| 6,548,938 | B1 | 4/2003 | Moler et al. |
| 6,567,255 | B1 | 5/2003 | Panzer et al. |
| 6,642,067 | B1 | 11/2003 | Dwyer |
| 6,759,790 | B1 | 7/2004 | Bugel et al. |
| 6,870,305 | B1 | 3/2005 | Moler |
| 2001/0030306 | A1 | 10/2001 | Moler et al. |
| 2004/0035106 | A1 | 2/2004 | Moler et al. |
| 2004/0045148 | A1 | 3/2004 | Moler |
| 2004/0125472 | A1 | 7/2004 | Belt |

FOREIGN PATENT DOCUMENTS

| | | |
|---|---|---|
| DE | 10122297 C1 | 6/2002 |
| EP | 0325764 | 8/1989 |
| EP | 1 391 647 | 6/2003 |
| GB | 2203195 A | 10/1988 |
| JP | 60-180026 | 9/1985 |
| JP | 6129681 | 12/1986 |
| JP | 01185175 | 7/1989 |
| WO | WO 0178160 | 10/2001 |

OTHER PUBLICATIONS

High Speed Servo Pneumatic Actuator Systems; (modified on Jan. 13, 2004); Design of High Speed Machinery (DHSM) LINK Programme; Engineering & Physical Sciences Research Council; Department of Trade & Industry; Mar. 1995 to Aug. 1997, Grant Reference: GR/K38663, summary only.

Journal of Zhejiang University SCIENCE; (ISSN 1009-3095, Monthly), 2001 vol. 2, No. 2, pp. 128-131; CLC No.: TP271-32; Document Code: A; Research On The Continuous Positioning Control To Servo-Pneumatic System; Tao Guo-liang, Wang Xuan-yin, & Lu Yong-xiang, abstract only.

Kuhnke "SPEEDY" Machine Building Process Module; Switched Pneumatic Electrical Endposition Damping—E635 GB/02 92.652.

Switched Pneumatic Electrical Endposition Damping; Werner Brockman; University of Lubeck Institute of Computer Engrg, Lubeck, Germany.

Block-Oriented Nonlinear Control of Pneumatic Actuator Systems; fulin Xiang; Doctoral Thesis, Mechatronics Lab, Department of Machine Design, Royal Institute of Technology, KTH; S-100 44, Stockholm, Sweden, 2001.

Hydraulic & Pneumatic Actuators; Sensors & Actuators for Mechatronics Hydraulic and Pneumatic Actuators; K. Craig.

Adaptive Neuron Control Based On Predictive Model In Pneumatic Servo System; Huang Wenmei, Yang Yong, Tang Yali; College of Mechanical and Automotive Engrg. Hunan University, 410082, Changsha, Huna, P.R. China.

Propneu—An Intelligent Software Tool; Hong Zhou, Ph.D., Festo A G & Co., Ruiterstr. 82, D-73734 Esslingen, Germany.

Pneumatic Servo Systems Controlled By Self-Tuning Fuzzy Rules; Akira Shimizu, Satoru Shibata, and Mitsuru Jindai, Dept. of Mech. Eng. Ehime University, 3, Bunkyo-cho, 790-8577, Matsuyama, Ehime, Japan.

MODELICA —Proceedings of the $3^{rd}$ International Modelica Confreence, Linkoping, Nov. 3-4, 2003, Peter Fritzson (editor).

High Steady-State Accuracy Pneumatic Servo Positioning System With PV A/PV Control and Friction Compensation; Shu Ning and Gary M. Bone; Dept. of Mechanical Engrg., McMaster University, Hamilton, Ontario, Canada, L8S 4L7.

Proceedings of the 2002 IEEE, International Conference on Robotics & Automation, Washington, DC—May 2002, 1 page only.

A Hyrbid Pneumatic/Electrostatic Milli-Actuator; Kenneth H. Chiang, Ronald S. Fearing; Robotics and Intelligent Machines Laboratory; Dept. of Electrical Engrg. And Computer Sciences; 265M Cory Hall, University of California, Berkeley, CA 94720-1770.

Modeling, Identification, and Control of a Pneumatically Actuated, Force Controllable Robot; J.E. Bobrow and B.W. McDonell; Irvine, California 92697.

Modelling and Simulation of Pneumatic Cylinders for a Physiotherapy Robot; R. Richardson, A.R.Plummer, M. Brown; School of Mechanical Engrg., University of Leeds, UK; Instron Ltd., UK.

* cited by examiner

ACCURATE FLUID OPERATED CYLINDER POSITIONING SYSTEM

CROSS-REFERENCE TO RELATED APPLICATIONS

This application is a continuation of provisional application Ser. No. 60/442,191 filed Jan. 23, 2003, a continuation of provisional application Ser. No. 60/471,031 filed May 16, 2003, and a continuation of provisional application Ser. No. 60/460,549 filed on Apr. 4, 2003, all of which are incorporated by reference herein in their entireties.

FIELD OF THE INVENTION

The present invention relates to an accurate positioning system for a fluid operated cylinder having at least one expandible chamber defined by a housing and a movable piston.

BACKGROUND OF THE INVENTION

Sales of cylinder positioning systems have generally fallen into one of two categories, simple and complex. A simple system is inexpensive, and typically uses timing or limit switches to achieve control. Although this type of system has significant cost advantages, it has some performance disadvantages. Limit switch systems lack the ability to dynamically change the point or points at which the cylinder stops, and timing controlled systems require constant pressure, load, and wear. Complex systems are more tolerant of pressure, load, and wear changes but have disadvantages in cost and complexity. Complex systems can cost between 10 and 20 times more than the simple system. The complex systems typically use fragile or expensive sensor technology, and require a trained, experienced person for installation.

SUMMARY OF THE INVENTION

It would be desirable in the present invention to provide an inexpensive and accurate fluid operated cylinder positioning system. It would be desirable to provide a system relatively tolerant of pressure, load, and wear changes while maintaining low cost and simplicity. Accordingly, the present invention discloses an accurate and inexpensive fluid operated cylinder positioning system and method. Positioning a cylinder or valve mainstage based on differential pressure according to the present invention can be a viable method of control that is more cost effective and completely different from current offerings by industry leaders. The present invention uses standard, inexpensive components and techniques to achieve control with accuracy approaching that of an expensive system, but with a cost comparable to a simple system.

A position control system according to the present invention is used for controlling a fluid operated cylinder having at least one fluid chamber defined by a piston located within a housing for movement between first and second end limits of travel. The system includes at least two electrically actuated proportional flow valves connected to each port of the fluid operated cylinder to be controlled for selectively and proportionally controlling fluid flow into and out of the at least one fluid chamber of the fluid operated cylinder to be controlled. At least one pressure sensor is provided for measuring fluid pressure with respect to each chamber of the fluid operated cylinder to be controlled. At least one discrete position sensor is located adjacent a midpoint of the fluid operated cylinder to be controlled for sensing a discrete centered position of the piston within the cylinder. A control program according to the present invention is operably connected to the at least two valves, the at least one pressure sensor, and the at least one position sensor for controlling actuation of the at least two valves in response to pressure measured by the at least one pressure sensor and location measured by the at least one position sensor.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
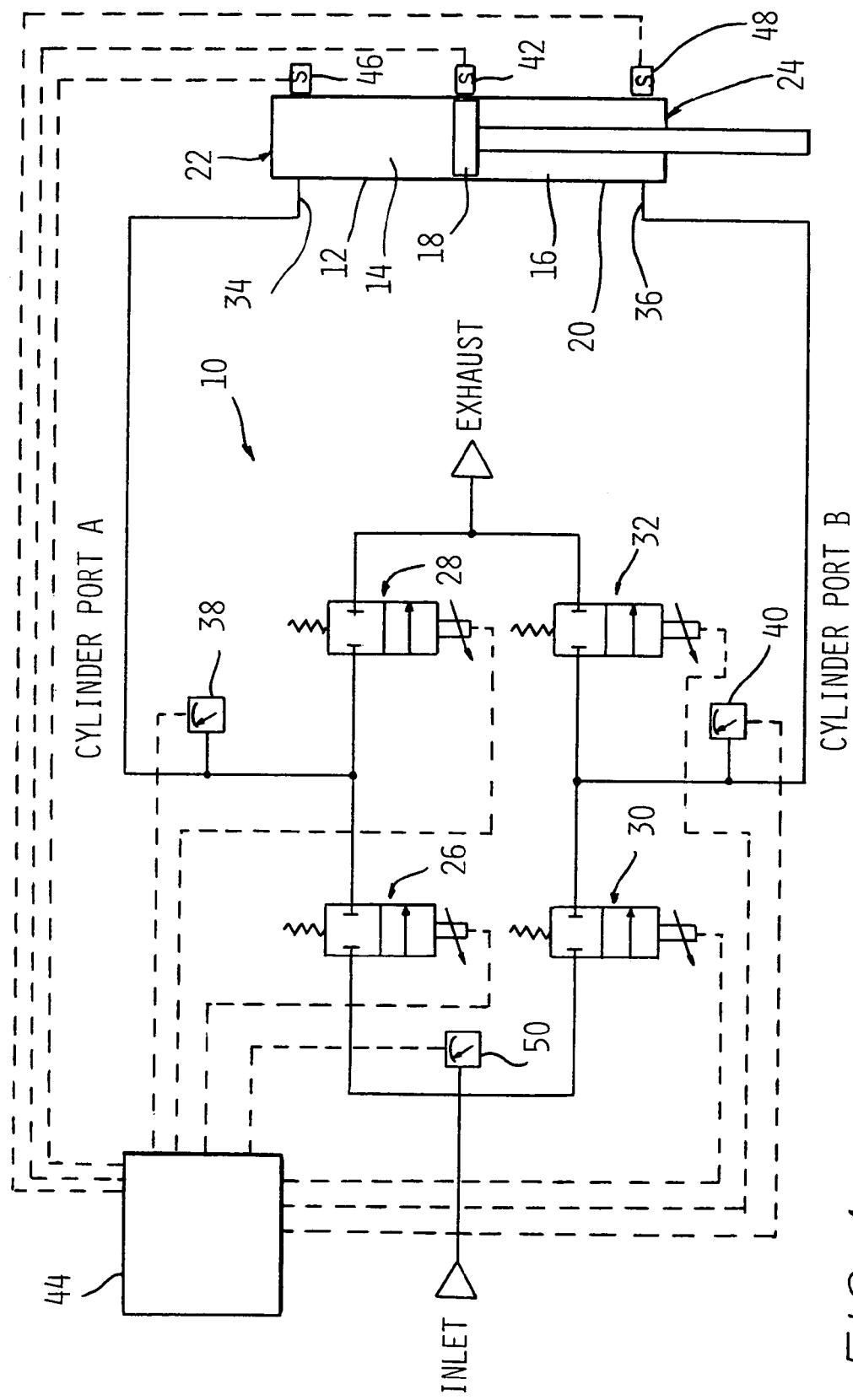
FIG. 1 is a simplified schematic diagram of a multiple valve configuration for controlling fluid flow with respect to at least one expandible chamber of a fluid operated cylinder in accordance with a control program stored in memory.

The present invention implements a pneumatic cylinder control scheme with a cost comparable to a simple system, but with performance approaching that of a complex system. The control scheme according to the present invention is a combination of hardware and software. The hardware is supportive of the required functions. However, actual operation is determined by the software. Further, the software is constructed in such a fashion that variables determine the actual final operation. This approach allows, for example, a variety of motion profiles, i.e. control of acceleration/deceleration profiles, velocity, timing, force, repetition, etc. In addition, this control scheme allows operation of either dual acting cylinders or single acting cylinders. In other words, the present invention can operate cylinders with fluid control on both sides, or cylinders with fluid on one side and a mechanism such as a spring to cause return on the other side. Although the description contained herein is oriented toward pneumatically operated cylinders, the control scheme according to the present invention as described also applies to other fluids such as hydraulics or other liquids. In yet another application of this control scheme, the cylinder can be replaced by a main stage valve. These are typically very large valves. In this case, the control scheme acts as a proportional pilot for the mainstage, allowing proportional positioning of the mainstage valve. Historically, the valve industry has used complex methods such as torque motors or proportional valves with precision feedback for controlling such mainstage valves. The device used for this application is referred to as a valve positioner control. The control scheme described herein according to the present invention can therefore be used to replace the existing positioner control. As with the cylinder, the mainstage valve can be operated with various fluids and can operate as a dual acting or as a single acting mainstage positioner.

According to the present invention, a method of controlling a standard pneumatic cylinder can be developed with reasonable accuracy by monitoring and changing the pressure on one or both sides of the piston. The basic theory behind this type of cylinder control is that if a known volume, i.e. a cylinder chamber, has a given amount of air pressure within that known volume, it will exert a known force on the chamber. This is demonstrated by the basic formula:

Force=Pressure×Area  (1)

With a known load and some reasonable assumptions about friction, the forces can be calculated on each side of the piston in a pneumatic cylinder. These forces will directly equate to the piston moving a known distance. The theory behind this assumption is proven in the next section In order to implement this type of control, three variables are monitored. First, two signals corresponding to the pressure in both chambers of the cylinder are required. This is achieved by pressure transducers on each inlet to the cylinder. Additionally a Hall-effect sensor, or other type of discrete position sensor, is used at mid-stroke to re-calibrate the system occasionally, thus maintaining system accuracy.

For the initial concept, some variables are assumed to be known and constant. These include cylinder load, friction, and wear. In the present invention these could be determined and compensated for in real time using common measuring and control methods such as adaptive algorithms if desired.

For the purpose of this explanation, inefficiencies such as heat of compression, friction, and losses due to change of air direction are ignored. This description applies to a double-acting cylinder, where the end with the rod is called the "load" end and the opposing end is the "cap" end.

The equation that governs the relationship between pressure differential within two chambers is:

$$\frac{P_c \cdot V_c}{T_c} = \frac{P_l \cdot V_l}{T_l} \quad (2)$$

Where $P_c$, $V_c$, and $T_c$ are Pressure, Volume, and Temperature for chamber 1 (or cap end) and $P_1$, $V_1$, and $T_1$ are Pressure, Volume, and Temperature for chamber 2 (or load end).

If we assume that the temperatures are equal, the equation is simplified to:

$$P_c \cdot V_c = P_1 \cdot V_1 \quad (3)$$

As already described above:

F=P·A  (4)

Where F, P, and A represent Force, Pressure, and Area, respectively.

This demonstrates that the force exerted within the cylinder is a function of the pressure on that end of the piston times the effective area. The effective area of the cap end of the piston is simply the internal area of the cylinder, and is represented by:

$$\frac{D_i^2 \cdot \pi}{4} = A_c \quad (5)$$

$D_i$ is the inner diameter of the cylinder and $A_c$ is the area of to cap-end of the cylinder.

The area for the load end of the piston is simply equation (5) above minus the area of the rod:

$$\frac{(D_i^2 - D_r^2) \cdot \pi}{4} = A_1 \quad (6)$$

Now that the area of the piston is known, it follows that the volume of the chambers can be described.

For the cap end, the volume is:

$$V_c = A_c \cdot L_c \quad (7)$$

where $L_c$ is the length from the inside end of the cap end to the surface of the piston.

For the load end, the volume is:

$$V_l = A_l L_l \quad (8)$$

where $L_l$ is the length from the inside end of the cap end to the surface of the piston.

Therefore, the volume of air in the cap end of the cylinder is:

$$V_c = \frac{D_i^2 \cdot \pi}{4} \cdot L_c \quad (9)$$

and the volume of air in the load end of the cylinder is:

$$V_1 = \frac{(D_i^2 - D_r^2) \cdot \pi}{4} \cdot L_1 \quad (10)$$

Combining this with equation (3) yields:

$$P_c \cdot \frac{D_i^2 \cdot \pi}{4} \cdot L_c = P_1 \cdot \frac{(D_i^2 - D_r^2) \cdot \pi}{4} \cdot L_1 \quad (11)$$

Finally, the pressures required to move the cylinder a certain distance are:

$$P_c D_i^2 \cdot \frac{L_c}{L_l(D_i^2 - D_r^2)} = P_1 \quad (12)$$

$$P_1 \cdot L_1 \frac{(D_i^2 - D_r^2)}{D_i^2 \cdot L_c} = P_c \quad (13)$$

Referring now to FIG. 1, implementation of the control method according to the present invention can be performed with a multi-valve configuration, such as a four-valve pack, coupled with two pressure transducers; i.e. one transducer for each port of the fluid operated cylinder. The transducers can be off-the-shelf parts, which are commercially available from vendors such as DigiKey. Operational amplifiers can be used for signal conditioning in a standard circuit configuration, and can be fed into analog inputs of the valve pack. A position control system 10 according to the present invention is illustrated in FIG. 1 for controlling a fluid operated cylinder 12 having at least one fluid chamber 14, 16 defined by a piston 18 located within a housing 20 for movement between first and second end limits of travel 22, 24. The system 10 can include at least two electrically actuated proportional flow valves 26, 28, 30, 32 connected to each port 34, 36 of the fluid operated cylinder 12 to be controlled. The valves 26, 28, 30, 32 selectively and proportionally control fluid flow into and out of the at least one fluid chamber 14, 16 of the fluid operated cylinder 12 to be controlled. At least one pressure sensor 38, 40 is provided for measuring fluid pressure with respect to each chamber 14, 16 of the fluid operated cylinder 12 to be controlled. At least one discrete position sensor 42 is located adjacent a midpoint of the fluid operated cylinder 12 to be controlled for sensing a discrete centered position of the piston 18 within the housing 20. A central processing unit 44 includes a control program and is operably connected to the at least two valves 26, 28, 30, 32, the at least one pressure sensor 38, 40, and the at least one position sensor 42 for controlling actuation of the at least two valves 26, 28, 30, 32 in response to pressure measured by the at least one pressure sensor 38, 40 and location measured by the at least one position sensor 42.

The at least one chamber 14, 16 can include a first expandable fluid chamber 14 adjacent one end of travel of the piston 18 in the housing 20 and a second expandable fluid chamber 16 adjacent another end of travel of the piston 18 in the housing 20. The at least two electrically actuated proportional flow valves 26, 28, 30, 32 can include a first valve 26 associated with the first expandable fluid chamber 14 for selectively and proportionally controlling fluid flow into the first expandable fluid chamber 14 and a second valve 28 associated with the first expandable fluid chamber 14 far selectively and proportionally controlling fluid flow out of the first expandable fluid chamber 14. The at least two electrically actuated proportional flow valves 26, 28, 30, 32 can also include a third valve 30 associated with the second expandable fluid chamber 16 for selectively and proportionally controlling fluid flow into the second expandable fluid chamber 14 and a fourth valve 32 associated with the second expandable fluid chamber 16 for selectively and proportionally controlling fluid flow out of the second expandable fluid chamber 16.

The at least one pressure sensor 38, 40 can include a first pressure sensor 38 associated with the first expandable fluid chamber 14 and a second pressure sensor 40 associated with the second expandable fluid chamber 16. A third pressure sensor 50 can be provided for monitoring the pressure of the pressurized fluid source. The at least one discrete position sensor 42 can include a first position sensor 42 located adjacent a midpoint of the fluid operated cylinder 12, a second position sensor 46 located adjacent one end of travel of the piston 18 in the housing 20 for providing soft stop deceleration of the piston 18 prior to contact with an end wall of the housing 20 defining the first chamber 14, and a third position sensor 48 located adjacent an opposite end of travel of the piston 18 in the housing 20 for providing soft stop deceleration of the piston prior to contact with an end wall of the housing 20 defining the second fluid chamber 16.

The control program according to the present invention can initialize a home position corresponding to the centered position of the piston 18 within the housing 20, when the piston 18 is sensed by the at least one discrete position sensor 42 located adjacent the midway position with respect to the housing 20. The control program according to the present invention can also calculate a value corresponding to an amount of pressure required in the at least one expandable fluid chamber 14, 16 for moving the piston 18 a desired distance within in the housing 20 from the discrete centered position located midway wit respect to the housing 20. The control program can control the at least two electrically actuated proportional flow control valves 26, 28 and/or 30, 32 to obtain the calculated pressure within the at least one expandable fluid chamber 14, 16 corresponding tote desired distance of movement for the piston 18 within the housing 20. Various means can be provided for biasing the piston 18 toward a predetermined position, such as the discrete centered position with respect to the housing 20. If only a single expandable fluid chamber is provided to be controlled by the present invention, the biasing means can include any suitable mechanical device, by way of example and not limitation, a return spring force. If two expandable fluid chambers 14, 16 are provided to be controlled by the system 10 according to the present invention, the biasing means corresponds to the second expandable fluid chamber. It should be recognized that the pressure calculations described in greater detail above can be modified to correspond to pressure acting against a mechanical spring force when determining the appropriate amount of pressure to provide in a single expandable fluid chamber, and that modifications to the pressure calculations could also be made to accommodate a dual piston rod configuration rather than the single rod piston configuration described in detail here.

The cylinder 12 preferably has two active expandable fluid chambers 14, 16 that effect a change in position and force of the piston 18 and connected rod. Two proportional control valves 26, 28 or 30, 32 are connected to each chamber 14, 16. One valve removes fluid, by way of example and not limitation, a fluid such as compressed air or hydraulic fluid, from the connected chamber, while the other valve supplies pressurized fluid to the connected chamber. The system includes control electronics (such as CPU 44 ), and preferably three pressure transducers 38, 40, 50. The control electronics 44, along with the onboard software, control the four proportional control valves 26, 28, 30, 32 in reponse to commands from an external source, by way of example and not limitation, such as commands from a network or computer workstation. The pressure transducers 38, 40, 50 monitor the pressure of the pressurized fluid supply, and both expandable fluid chambers 14, 16 in an effort to control the dispensing of pressurized fluid to and from the expandable chambers 14, 16 to provide accurate positioning control of the piston 18 and connected rod output force. In the preferred configuration, the proportional confrol valves 26, 28, 30, 32 can be piezo-electric actuated control valves of a type similar to those described in U.S. Pat. No. 6,548,938 issued on Apr. 15, 2003, or a piezoelectric actuator ot the type similar to that disclosed in U.S. Design Pat No. D483,335 issued on Dec. 9, 2003, or PCT Published Application No. WO 04/006,349 published on Jul. 3, 2003, or PCT Published Application No. WO 03/083,957 published on Mar. 25, 2003, or PCT Published Application No. WO 03/067,674 published on Jan. 22, 2003, or PCT Published Application No. WO 01/80,326 published on Mar. 29, 2001, or PCT Published Application No. WO 01/79,731 published on Mar. 29, 2001, all of which are incorporated by reference herein in their entireties. Preferably, by way of example and not limitation, the piezo-electric actuator is controlled for proportional valve operation by direct control of the voltage applied to the piezo, or by monitoring the amount of energy in the piezo-electric actuator and using a curent charge control, which is different than pulse width modulation as used for proportional control of solenoid operated valves.

The software code controls both pairs of valves on each side of the cylinder simultaneously as described in the control flow chart. The control program according to the present invention can best be understood by reference to FIG. 2. The control program can begin by initializing the system in step 100. During the initialization step 100, the control program locates a home or piston-centered position as indicated by a Hall-effect sensor, and brings pressure on both sides of the piston 18 to be equal to one another so that there is no movement of the piston 18 within the housing. By way of example and not limitation, the control system can bring the pressure on both sides of the cylinder to 50 psi while at the centered position, which can be verified by the signals received from the at least one position sensor 42 and the at least one pressure sensor 38, 40. Once the system is initialized in step 100, the control program continues to query 102 to determine if a change in position is desired. If a change in position is not desired, the control program returns to the beginning of query 102. If a change in position is desired, the control program continues to step 104 where the necessary pressure is calculated based on the desired movement. The control program then continues to query 106 where it is determined if the desired position is toward the cap end of the cylinder 12. If the desired position is toward the cap end, the program branches to step 108 where pressure is raised in the load end expandable fluid chamber of the cylinder 20. If the desired position is not toward the cap end in response to query 106, the control program branches to step 110 where pressure is raised in the cap end expandable fluid chamber of the cylinder 20.

After performing either step 108 or step 110, the program continues to query 112 where it is determined if the pressures on either side of the piston 18 are equal. If the pressures are not equal, the program branches to step 114 to monitor the at least one position sensor 42 and to reset the home centered position of the piston 18. After performing step 114, the control program returns to the beginning of query 112. If the pressures are equal in query 112, the control program continues to query 116 where it is determined if the desired position is toward the load end of the cylinder 20. If the desired position is toward the load end in response to query 116, the control program continues to step 118 where pressure is lowered in the load end expandable fluid chamber of the cylinder 20. If the desired position is not toward the load end in response to query 116, the control program continues to step 120 where the pressure is lowered in the cap end expandable fluid chamber of the cylinder 20.

After performing either step 118 or step 120, the program continues to query 122, where it is determined if the pressures on both sides of the piston 18 are equal. If the pressures on both sides of the piston 20 are not equal in response to query 122, the control program branches to step 124 to monitor the at least one position sensor 42 and to reset the home centered position of the piston 18 in the housing 20. After performing step 124, the control program returns to the beginning of query 122 to determine if the pressures on both sides of the piston 18 are equal. If the pressures on both sides of the piston 18 are equal in response to query 122, the control program continues to step 126 indicating that the piston 18 is done moving, since the piston has reached the desired position, and the current position is saved by the control program. After performing step 126, the control program returns to the beginning of query 102.

Figure 2:
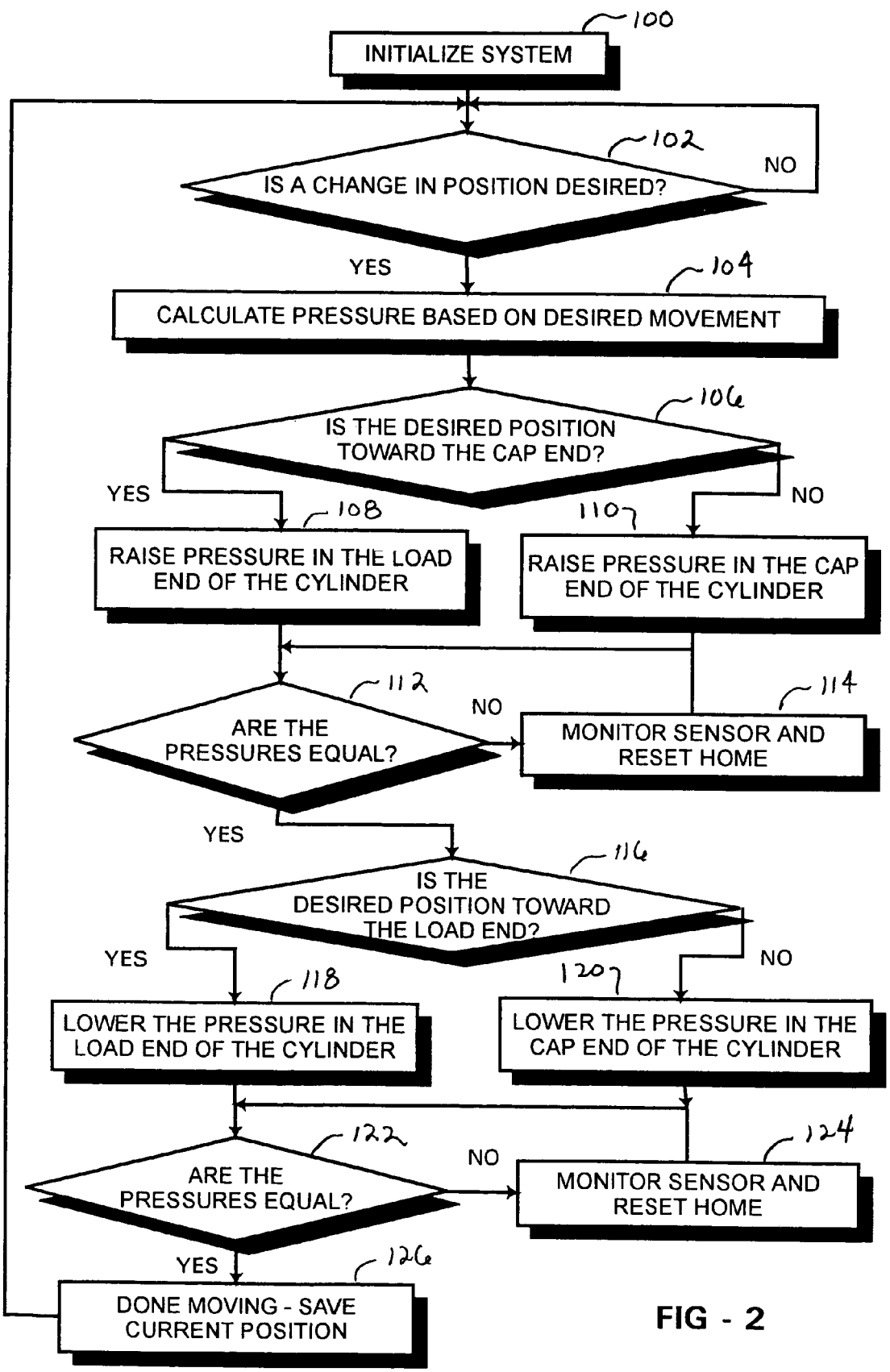
FIG. 2 is a simplified schematic view of a flow diagram for the control program according to the present invention.

It should be recognized that the control program described in FIG. 2 corresponds to a cylinder 12 having first and second expandable fluid chambers 14, 16 defined by a piston 18 located within a housing 20 for movement between first and second end limits of travel. If only a single expandable fluid chamber is provided, the control program illustrated in FIG. 2 can be modified by eliminating query 116, steps 118, 120, query 122 and step 124. In this configuration, if the answer to query 112 is yes, the control program can continue directly to step 126 and continue as previously described. As previously described in greater detail above, this configuration can include mechanical means for biasing the piston 18 toward the home centered position with respect to the housing 20, by way of example and not limitation, such as a mechanical spring force.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A position control system for a fluid operated cylinder having at least one fluid chamber defined by a piston located within a housing for movement between first and second end limits of travel, the system comprising;
    at least two electrically actuated proportional flow valves connected to each port of the fluid operated cylinder to be controlled for selectively and proportionally controlling fluid flow into and out of the at least one fluid chamber of the fluid operated cylinder to be controlled;
    at least one pressure sensor for measuring fluid pressure with respect to each chamber of the fluid operated cylinder to be controlled;
    at least one discrete position sensor including a first position sensor located adjacent a midpoint of the fluid operated cylinder to be controlled for sensing a discrete centered position of the piston within the cylinder; and
    a controller having a control program operably connected to the at least two valves, the at least one pressure sensor, and the at least one position sensor for controlling actuation of the at least two valves in response to pressure measured by the at least one pressure sensor and location measured by the at least one position sensor, the controller having the control program for calculating a required pressure in the at least one expandable fluid chamber for moving the piston a desired distance within the housing from the discrete centered position located midway with respect to the housing, and for controlling the at least two electrically actuated proportional flow valves to obtain the calculated pressure within the at least one expandable fluid chamber corresponding to the desired distance of movement for the piston within the housing.

2. The system of claim 1, wherein the at least one discrete position sensor further comprises:
    a second position sensor located adjacent one end of travel of the piston in the housing for providing soft stop deceleration of the piston prior to contact with an end wail of the housing defining the at least one chamber.

3. The system of claim 1 further comprising:
    the at least two electrically actuated proportional flow valves including a first valve associated with the first expandable fluid chamber for selectively and proportionally controlling fluid flow into the first expandable fluid chamber and a second valve associated with the first expandable fluid chamber for selectively and proportionally controlling fluid flow out of the first expandable fluid chamber.

4. The system of claim 1 further comprising:
    the at least one expandable fluid chamber including a first expandable fluid chamber adjacent one end of travel of the piston in the housing and a second expandable fluid chamber adjacent another end of travel of the piston in the housing.

5. The system of claim 4 further comprising:

the at least one pressure sensor includes a first pressure sensor associated with the first expandable fluid chamber and a second pressure sensor associated with the second expandable fluid chamber.

6. The system of claim 4 further comprising:

the at least one discrete position sensor including a second position sensor located adjacent one end of travel of the piston in the housing for providing soft stop deceleration of the piston prior to contact with an end wall of the housing defining one chamber, and a third position sensor located adjacent an opposite end of travel of the piston in the housing for providing soft stop deceleration of the piston prior to contact with an end wall of the housing defining another chamber.

7. The system of claim 1 wherein the control program is operable to initialize a home position when the piston is sensed by the first position sensor located adjacent the midway position with respect to the housing.

8. The system of claim 1 further comprising:

the control program having variables to define a motion profile of the piston selected from a group of a plurality of motion profiles consisting of an acceleration profile, a deceleration profile, a velocity profile, a timing profile, a force profile, a repetition profile, and any combination thereof.

9. The system of claim 1 further comprising:

means for biasing the piston toward a predetermined position with respect to the housing.

10. A process for operating a position control system for a fluid operated cylinder having at least one fluid chamber defined by a piston located within a housing for movement between first and second end limits of travel, the process comprising the steps of:

selectively and proportionally controlling fluid flow into and out of the at least one fluid chamber of the fluid operated cylinder to be controlled with at least two electrically actuated proportional flow valves connected to each port of the fluid operated cylinder to be controlled;

measuring fluid pressure with respect to each chamber of the fluid operated cylinder to be controlled with at least one pressure sensor;

sensing a position of the piston within the cylinder with at least one discrete position sensor, the at least one discrete position sensor including a first position sensor located adjacent a midpoint of the fluid operated cylinder to be controlled; and controlling actuation of the at least two valves in response to pressure measured by the at least one pressure sensor and location measured by the at least one position sensor with a controller having a control program operably connected to the at least two valves, the at least one pressure sensor, and the at least one position sensor, wherein the controlling step with a control program further includes the steps of calculating a required pressure in the at least one expandable fluid chamber for moving the piston a desired distance within the housing from the discrete centered position located midway with respect to the housing, and controlling the at least two electrically actuated proportional flow valves to obtain the calculated pressure within the at least one expandable fluid chamber corresponding to the desired distance of movement for the piston within the housing.

11. The process of claim 10, further comprising the steps of:

sensing a discrete position adjacent one end of travel of the piston with respect to the housing with a second position sensor, the second position sensor adjacent one end of travel of the piston in the housing; and decelerating the piston to a soft stop prior to contact with an end wall of the housing defining the at least one chamber with the controller in response to the second position sensor.

12. The process of claim 10, wherein the controlling fluid flow step with at least two electrically actuated proportional flow valves further comprises the steps of:

providing a first valve associated with the first expandable fluid chamber for selectively and proportionally controlling fluid flow into the first expandable fluid chamber; and providing a second valve associated with the first expandable fluid chamber for selectively and proportionally controlling fluid flow out of the first expandable fluid chamber.

13. The process of claim 10 wherein the at least one expandable fluid chamber further comprises the steps of:

providing a first expandable fluid chamber adjacent one end of travel of the piston in the housing; and providing a second expandable fluid chamber adjacent another end of travel of the piston in the housing.

14. The process of claim 13, wherein the pressure sensing step with at least one pressure sensor further comprises the steps of:

providing a first pressure sensor associated with the first expandable fluid chamber; and providing a second pressure sensor associated with the second expandable fluid chamber.

15. The process of claim 13, further comprising the steps of:

providing a second position sensor located adjacent one end of travel of the piston in the housing for providing soft stop deceleration of the piston prior to contact with an end wall of the housing defining one chamber; and providing a third position sensor located adjacent an opposite end of travel of the piston in the housing for providing soft stop deceleration of the piston prior to contact with an end wall of the housing defining another chamber.

16. The process of claim 10, wherein the controlling step with a control program further comprises the step of:

initializing a home position when the piston is sensed by the at least one discrete position sensor to be located at the discrete centered position with respect to the housing.

17. The process of claim 10 further comprising the steps of:

selecting variables for the control program to define a motion profile of the piston from a group a plurality of motion profiles consisting of an acceleration profile, a deceleration profile, a velocity profile, a timing profile, a force profile, a repetition profile, and any combination thereof.

18. The process of claim 10 further comprising the step of: biasing the piston toward predetermined position with respect to the housing.

19. A position control system for a fluid operated cylinder having two fluid chambers defined by a piston located within a housing for movement between first and second end limits of travel, the system comprising:
  four electrically actuated proportional flow valves, two valves connected to each port of the fluid operated cylinder to be controlled for selectively and proportionally controlling fluid flow into and out of the two fluid chambers of the fluid operated cylinder to be controlled;
  two pressure sensors, one pressure sensor for measuring fluid pressure with respect to each chamber of the fluid operated cylinder to be controlled;
  at least one discrete position sensor including a first position sensor located adjacent a midpoint of the fluid operated cylinder to be controlled for sensing a discrete centered position of the piston within the cylinder; and
  a controller having a control program operably connected to the four valves, the two pressure sensors, and the at least one position sensor for controlling actuation of the four valves in response to pressure measured by the two pressure sensors and location measured by the at least one position sensor, the controller having the control program for calculating a required pressure in each of the first and second expandable fluid chambers for moving the piston a desired distance within the housing from the discrete centered position located midway with respect to the housing, and for controlling the four electrically actuated proportional flow valves to obtain the calculated pressure within each of the first and second expandable fluid chambers corresponding to the desired distance of movement for the piston within the housing.

20. The system of claim 19 farther comprising:
  the at least one discrete position sensor including a second position sensor located adjacent one end of travel of the piston in the housing for providing soft stop deceleration of the piston prior to contact with an end wall of the housing defining the first chamber, and a third position sensor located adjacent an opposite end of travel of the piston in the housing for providing soft stop deceleration of the piston prior to contact with an end wall of the housing defining the second chamber.

21. The system of claim 19 wherein the control program is operable to initialize a home position when the piston is sensed by the at least one discrete position sensor located adjacent the midway position with respect to the housing.

22. The system of claim 19 further comprising:
  the control program having variables to define a motion profile of the piston selected from a group of a plurality of motion profiles consisting of an acceleration profile, a deceleration profile, a velocity profile, a timing profile, a force profile, a repetition profile, and any combination thereof.

23. A position control system for a fluid operated cylinder having at least one fluid chamber defined by a piston located within a housing for movement between first and second end limits of travel, the system comprising:
  at least two electrically actuated proportional flow valves connected to each port of the fluid operated cylinder to be controlled for selectively and proportionally controlling fluid flow into and out of the at least one fluid chamber of the fluid operated cylinder to be controlled;
  at least one discrete position sensor associated with the fluid operated cylinder to be controlled for sensing a discrete position of the piston within the cylinder;
  a supply of pressurized fluid in communication with the at least two electrically actuated proportional flow valves at a predetermined pressure; and
  a controller having a control program operably connected to the at least two valves and the least one position sensor for controlling respective positions of the at least two valves in response to position measured by the at least one position sensor, the controller having the control program for calculating a required pressure in the at least one expandable fluid chamber for moving the piston a desired distance within the housing from the discrete centered position located midway with respect to the housing, and for controlling the at least two electrically actuated proportional flow valves to obtain the calculated pressure within the at least one expandable fluid chamber corresponding to the desired distance of movement for the piston within the housing.

24. The system of claim 23, wherein the at least one discrete position sensor farther comprises:
  a first position sensor located adjacent a midpoint of the fluid operated cylinder; and
  a second position sensor located adjacent one end of travel of the piston in the housing for providing soft stop deceleration of the piston prior to contact with an end wall of the housing defining the at least one chamber.

25. The system of claim 23 further comprising:
  the at least two electrically actuated proportional flow valves including a first valve associated with the first expandable fluid chamber for selectively and proportionally controlling fluid flow into the first expandable fluid chamber and a second valve associated with the first expandable fluid chamber for selectively and proportionally controlling fluid flow out of the first expandable fluid chamber.

26. The system of claim 23 further comprising:
  the at least one expandable fluid chamber including a first expandable fluid chamber adjacent one end of travel of the piston in the housing and a second expandable fluid chamber adjacent another end of travel of the piston in the housing.

27. The system of claim 26 further comprising:
  the at least one discrete position sensor including a first position sensor located adjacent a midpoint of the fluid operated cylinder, a second position sensor located adjacent one end of travel of the piston in the housing for providing soft stop deceleration of the piston prior to contact with an end wall of the housing defining one chamber, and a third position sensor located adjacent an opposite end of travel of the piston in the housing for providing soft stop deceleration of the piston prior to contact with an end wall of the housing defining another chamber.

28. The system of claim 23 wherein the control program is operable to initialize a home position when the piston is sensed by the at least one discrete position sensor located adjacent the midway position with respect to the housing.

29. The system of claim 23 further comprising:
  the control program having variables to define a motion profile of the piston selected from a group of a plurality of motion profiles consisting of an acceleration profile, a deceleration profile, a velocity profile, a timing profile, a force profile, a repetition profile, and any combination thereof.

30. The system of claim 23 further comprising:
  means for biasing the piston toward a predetermined position with respect to the housing.

* * * * *